United States Patent
Itou

(10) Patent No.: US 6,595,692 B2
(45) Date of Patent: Jul. 22, 2003

(54) ROTATION SENSOR-EQUIPPED BEARING

(75) Inventor: Hiroyoshi Itou, Kuwana (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 10/029,387

(22) Filed: Dec. 28, 2001

(65) Prior Publication Data

US 2002/0094145 A1 Jul. 18, 2002

(30) Foreign Application Priority Data

Jan. 15, 2001 (JP) ........................................ 2001-006818

(51) Int. Cl.$^7$ ............................................. F16C 32/00
(52) U.S. Cl. ...................................................... 384/448
(58) Field of Search .......................... 384/448; 324/173, 324/174, 207.25

(56) References Cited

U.S. PATENT DOCUMENTS

| | | | | |
|---|---|---|---|---|
| 4,946,295 A | * | 8/1990 | Hajzler | 384/448 |
| 5,143,458 A | * | 9/1992 | Alff et al. | 384/448 |
| 5,594,334 A | * | 1/1997 | Sonnerat et al. | 324/173 |
| 6,043,643 A | * | 3/2000 | Message et al. | 324/174 |
| 6,094,046 A | * | 7/2000 | Message et al. | 324/173 |
| 6,338,576 B1 | * | 1/2002 | Girardin et al. | 384/448 |

* cited by examiner

*Primary Examiner*—Thomas R. Hannon
(74) *Attorney, Agent, or Firm*—Arent Fox Kintner Plotkin & Kahn

(57) ABSTRACT

A rotation sensor-equipped bearing comprising an encoder 8 mounted to an inner ring 2 constituting the rotatable raceway ring of a bearing 1, a core metal 9 mounted to the inner diameter surface of an outer ring 3 mounted to a bearing housing 6 and constituting a fixed raceway ring, a sensor housing 10 fixed to the core metal 9, the sensor housing 10 having a sensor 11 and a circuit board 12 received therein, an electric wire 13 connected to the circuit board 12, the interior of the sensor housing 10 being molded with resin, wherein the outer diameter surface of the sensor housing 10 is integrally formed with a radially projecting rotation stop member 16. The rotation stop member 16 being disposed in a notch groove 14$a$ in a hold-down lid 14 fixed to the bearing housing 6.

3 Claims, 2 Drawing Sheets

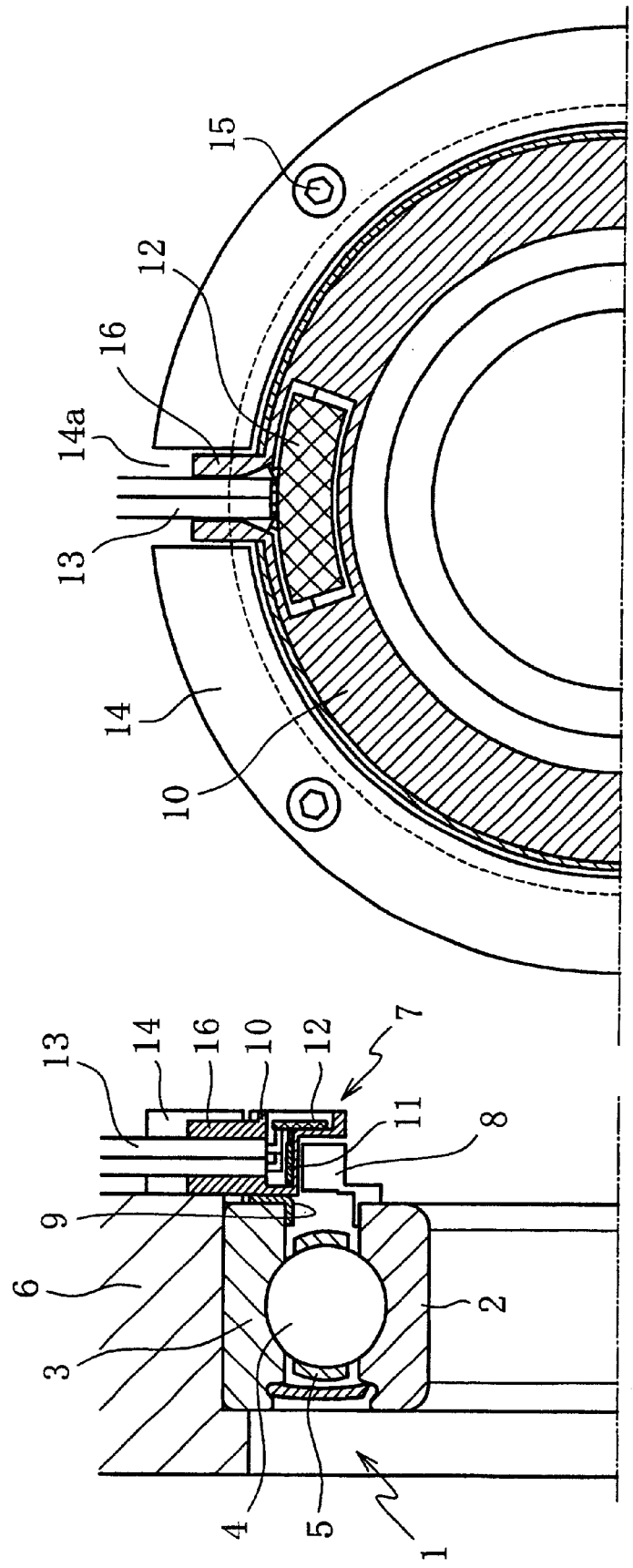

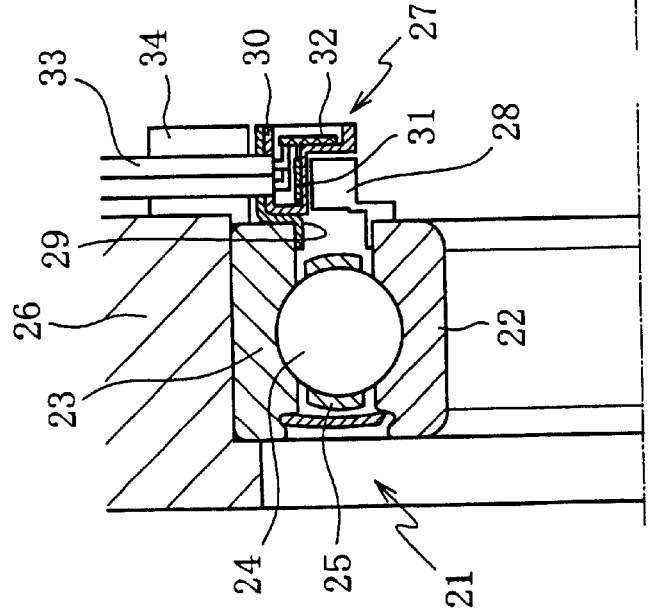
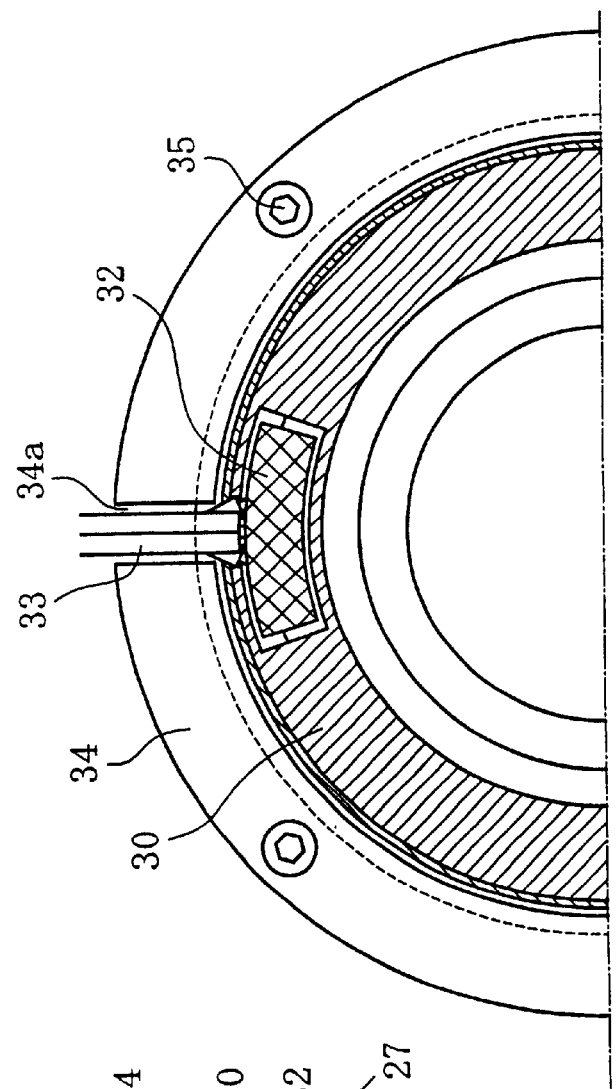
FIG. 2(B) PRIOR ART
FIG. 2(A) PRIOR ART

ROTATION SENSOR-EQUIPPED BEARING

BACKGROUND OF THE INVENTION

1. Field of the Invention

The present invention relates to a rotation sensor-equipped bearing and particularly it relates to an outer ring rotation stop construction.

2. Brief Description of the Prior Art

Detection of rotational speed (rpm) of a bearing has heretofore been made by installing a rotation sensor in close vicinity to the bearing. Recently, however, for the sake of facilitation of installation and effective use of space, rotation sensor-equipped bearings with a rotation sensor fixed to the bearing have been proposed.

A conventional example of such rotation sensor-equipped bearing will be described with reference to the drawings. FIG. 2(A) is a front view of the rotation sensor section, which is the principal portion of a rotation sensor-equipped bearing, and FIG. 2(B) is a sectional view thereof.

In FIG. 2, the numeral 21 denotes a bearing comprising an inner ring 22, an outer ring 23, a plurality of rolling elements 24 rollably disposed between the inner and outer rings 22 and 23, and a cage 25 for rollably receiving said rolling elements 24 at a predetermined pitch. The outer diameter portion of said outer ring 23 is mounted to the inner diameter portion of a bearing housing 26. The numeral 27 denotes rotation sensor comprising an encoder 28, such as a magnetic encoder, fixed to said inner ring 22, a core metal 29 mounted to said outer ring 23, a sensor housing 30 fixed to said core metal 29, a sensor 31 fixed within the sensor housing 30, a circuit board 32 having a circuit incorporated therein for processing electric signals obtained by the sensor 31, an electric wire 33 for taking the detected rotational speed (rpm) from the circuit board 32, wherein the sensor 31, circuit board 32, the connected end of electric wire 33, etc., within said sensor housing 30 are molded with resin. Further, a hold-down lid 34 is attached to a bearing housing 26 by fixing members 35 such as machine screws at a plurality of circumferential places. The electric wire 33 is taken out to the outside through a notch groove 34a formed in the hold-down lid 34.

And, when the inner ring 22 rotates, the encoder 28 mounted to this inner ring 22 rotates with the inner ring 22 and concomitantly therewith its position relative to the sensor 31 periodically changes, whereby the sensor 31 detects the rotational speed (rpm) of the inner ring 22, the detected rotational speed (rpm) being taken out as an electric signal to the outside by the electric wire 33.

However, in the conventional rotation sensor-equipped bearing described above, since the outer ring 23 is mounted by fitting in the bearing housing 26, the difference in thermal expansion between the outer ring 23 and the bearing housing 26, and other factors cause the clearance between the outer diameter of the outer ring 23 and the inner diameter of the bearing housing 26 to exceed the allowable limit, so that with the rotation of the inner ring 22, the outer ring 23 sometimes rotates along the direction of rotation of the inner ring 22. If the outer ring 23 should rotate, the sensor housing 30 mounted to the outer ring 23 will simultaneously rotate, resulting in a shearing force being applied to the electric wire 33 taken out of the sensor housing 30 since the latter is taken out to the outside through the notch groove 34a formed in the hold-down lid 34 fixed to the bearing housing 26. Therefore, in extreme cases, the electric wire 33 sometimes breaks.

SUMMARY OF THE INVENTION

Accordingly, it is an object of the invention to provide a rotation sensor-equipped bearing, such as the one described above, having a rotation stop construction for the outer ring capable of preventing the rotation of the outer ring and the breakage of the electric wire when the outer ring tends to rotate.

A rotation sensor-equipped bearing described in claim 1, for solving said problem, comprises an inner ring, an outer ring, a plurality of rolling elements received between said inner and outer rings, said inner ring constituting a rotatable raceway ring, an encoder mounted to one end of said rotatable raceway ring, said outer ring being mounted to the bearing housing to constitute a fixed raceway ring, a sensor mounted to said fixed raceway ring in a position opposed to said encoder through a core metal, and a hold-down lid fixed to said bearing housing, said rotation sensor-equipped bearing being characterized in that the outer diameter surface of a sensor housing receiving said sensor is provided with a rotation stop member radially projecting through said core metal, said rotation stop member being disposed in a notch groove in said hold-down lid.

Thus, providing the outer diameter surface of the sensor housing receiving the sensor with the rotation stop member radially projecting through said core metal and disposing the rotation stop member in the notch groove in said hold-down lid ensures that even if a turning force is produced in the bearing outer ring, the disposition of the rotation stop member in the notch groove in the hold-down lid results in the rotation stop member abutting against the inner wall surface of the notch groove in the hold-down lid, thereby reliably preventing the rotation of the bearing outer ring. Simultaneously, since the rotation stop member serves as a fixing member for the electric wire, the pull-out strength of the electric wire is improved, thus preventing the breakage of the electric wire.

A rotation sensor-equipped bearing of the invention is characterized in that the rotation stop member is integral with the sensor housing.

Thus, this construction in which the rotation stop member is integral with the sensor housing eliminates the possibility of the rotation stop member rotating relative to the sensor housing and makes it possible to omit the operation of attaching the rotation stop member to the sensor housing.

A rotation sensor-equipped bearing of the invention is characterized in that the rotation stop member is separate from the sensor housing member and is attached to said sensor housing member.

Thus, this construction in which the rotation stop member is separate from the sensor housing member and is attached to said sensor housing member allows separate fabrication of the rotation stop member and sensor housing, so that as compared with the case of constructing the rotation stop member to be integral with the sensor housing member, fabrication molds are simplified and so is the production, and moreover, even if the rotation stop member or the sensor housing member should be partly damaged and discarded, discarding the whole of the rotation stop member and sensor housing member is saved.

BRIEF DESCRIPTION OF THE DRAWINGS

FIG. 1(A) is a principal front view of an outer ring rotation stop construction for a rotation sensor-equipped bearing according to an embodiment of the invention; and (B) is a sectional view thereof;

FIG. 2(A) is a front view of the principal portion of a conventional rotation sensor-equipped bearing; and (B) is a sectional view thereof.

DESCRIPTION OF THE PREFERRED EMBODIMENT

An embodiment of the invention will now be described with reference to the drawings.

FIG. 1(A) is a principal front view of the rotation sensor section and outer ring rotation stop section of a rotation sensor-equipped bearing according to the embodiment, and FIG. 1(B) is a principal sectional view. In FIGS. 1(A) and (B), the numeral 1 denotes a bearing comprising an inner ring 2, an outer ring 3, a plurality of rolling elements 4 rollably disposed between these inner and outer rings 2 and 3, and a cage 5 for rollably receiving these rolling elements 4 with a predetermined pitch. The outer diameter surface of said outer ring 3 is mounted by fitting in the inner diameter surface of a bearing housing 6. The numeral 7 denotes a rotation sensor comprising an encoder 8, such as a magnetic encoder, mounted to the outer diameter surface of said inner ring 2, a core metal 9 mounted to the inner diameter portion of said outer ring 3, a sensor housing 10 fixed to the core metal 9 by press fitting, a sensor 11 incorporated in the interior of the sensor housing 10, a circuit board 12 having a circuit incorporated therein for processing electric signals detected by said sensor 11, and an electric wire 13 for taking out rotational speed (rpm) from said circuit board 12 to the outside, the interior of the sensor housing 10 being molded with thermosetting resin (illustration omitted) such as polyurethane or epoxy. A hold-down lid 14 is fixed to the bearing housing 6 by fixing members 15, such as machine screws, at a plurality of circumferential places. A rotation stop member 16 for preventing rotation of the outer ring 3 is formed having a shape such that it radially projects from the outside through the core metal 9 of the sensor housing 10 integral with the sensor housing 10, said rotation stop member 16 projecting into the notch groove 14a in the hold-down lid 14 and surrounding the electric wire 13 to protect the latter. Further, said rotation stop member 16 performs the role of preventing the outer ring 3 from rotating in the direction of rotation.

Thus, forming the rotation stop member 16 integral with the sensor housing 10 in such a manner as to project through the core metal 9 into the notch groove 14a formed in the hold-down lid 14 ensures that even if a turning force is produced in the outer ring 3, the side surface of the radially projecting rotation stop member 16 abuts against the inner wall surface of the notch groove 14a formed in the hold-down lid 14, thereby preventing the rotation of the outer ring 3. Simultaneously, the shearing force acting on the electric wire 13 is resisted by the rotation stop member 16, thereby preventing the breakage of the electric wire 13.

Further, in the case where the rotation stop member 16 is made integral with the sensor housing 10 as in the above embodiment, the sensor housing 10 and rotation stop member 16 can be simultaneously formed, thus offering an advantage that the number of man-hours is reduced.

Further, instead of forming the rotation stop member 16 integral with the sensor housing 10 as in the above embodiment, they may be separately formed and then the rotation stop member 16 may be attached to the sensor housing 10. In the case of forming the rotation stop member 16 separately from the sensor housing 10 and then attaching the former to the latter, their respective fabrication molds become simple, easy to make, and inexpensive, and moreover if either the sensor housing 10 or the rotation stop member 16 should be damaged, only the damaged member may be discarded, so that the waste of material is reduced.

In addition, in the above embodiment, the case of mounting the core metal 9, used to fix the sensor housing 10, to the inner diameter surface of the outer ring 3 has been shown; however, it may be mounted to the outer diameter surface or side surface of the outer ring 3.

In addition, in the above embodiment, the direction of detection of rotational speed (rpm) by the rotation sensor composed of the encoder 8 and sensor 11 is set in the radial direction of the bearing 1; however, it may be set in the axial direction of the bearing 1.

As described above, the present invention provides a rotation sensor-equipped bearing comprising an inner ring, an outer ring, a plurality of rolling elements received between said inner and outer rings, said inner ring constituting a rotatable raceway ring, an encoder mounted to one end of said rotatable raceway ring, said outer ring being mounted to the bearing housing to constitute a fixed raceway ring, a sensor mounted to said fixed raceway ring in a position opposed to said encoder through a core metal, and a hold-down lid fixed to said bearing housing, said rotation sensor-equipped bearing being characterized in that the outer diameter surface of a sensor housing receiving said sensor is provided with a rotation stop member radially projecting through said core metal, said rotation stop member being disposed in a notch groove in said hold-down lid. Therefore, even in the case where a turning force acts on the outer ring, said rotation stop member abuts against the inner wall surface of the notch groove in the hold-down lid, thereby preventing the rotation of the outer ring and sensor housing, protecting the electric wire from shearing; thus, the reliability and service life of the sensor section improve. Further, since the rotation of the outer ring can be prevented, the creep phenomenon of the outer ring diameter surface can be prevented, so that the reliability and service life of the bearing improve. Further, since there is no need to form a surplus groove or notch in the bearing outer ring to prevent the rotation of the outer ring; therefore, there is no danger of the bearing rigidity being lowered.

What is claimed is:

1. A rotation sensor-equipped bearing comprising an inner ring, an outer ring, a plurality of rolling elements received between said inner and outer rings, said inner ring constituting a rotatable raceway ring, an encoder mounted to one end of said rotatable raceway ring, said outer ring being mounted to a bearing housing to constitute a fixed raceway ring, a sensor mounted to said fixed raceway ring in a position opposed to said encoder through a core metal, and a hold-down lid fixed to said bearing housing, said rotation sensor-equipped bearing being characterized in that the outer diameter surface of a sensor housing receiving said sensor is provided with a rotation stop member radially projecting through said core metal, said rotation stop member being disposed in a notch groove in said hold-down lid.

2. A rotation sensor-equipped bearing asset forth in claim 1, characterized in that the rotation stop member is integral with the sensor housing.

3. A rotation sensor-equipped bearing asset forth in claim 1, characterized in that the rotation stop member is separate from the sensor housing and is attached to said sensor housing member.

* * * * *